United States Patent
Skärby et al.

(10) Patent No.: US 10,069,581 B2
(45) Date of Patent: Sep. 4, 2018

(54) METHOD AND NODE FOR CONTROLLING AN UPLINK NOISE FIGURE AND GAIN

(71) Applicant: TELEFONAKTIEBOLAGET LM ERICSSON (PUBL), Stockholm (SE)

(72) Inventors: Ulf Skärby, Lidingö (SE); Miguel Berg, Upplands Väsby (SE); Peter Pääkkönen, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 76 days.

(21) Appl. No.: 15/305,207

(22) PCT Filed: May 9, 2014

(86) PCT No.: PCT/SE2014/050573
§ 371 (c)(1),
(2) Date: Oct. 19, 2016

(87) PCT Pub. No.: WO2015/171031
PCT Pub. Date: Nov. 12, 2015

(65) Prior Publication Data
US 2017/0126339 A1    May 4, 2017

(51) Int. Cl.
*H04W 72/04* (2009.01)
*H04B 17/345* (2015.01)
*H04B 7/04* (2017.01)
*H04B 17/318* (2015.01)
*H04W 88/08* (2009.01)

(52) U.S. Cl.
CPC ............ *H04B 17/345* (2015.01); *H04B 7/04* (2013.01); *H04B 17/318* (2015.01); *H04W 72/0413* (2013.01); *H04W 88/085* (2013.01)

(58) Field of Classification Search
None
See application file for complete search history.

(56) References Cited

U.S. PATENT DOCUMENTS

2008/0198955 A1    8/2008  Oren et al.
2010/0158200 A1*   6/2010  Marigliano ........ H04Q 11/0435
                                                          379/27.01
(Continued)

FOREIGN PATENT DOCUMENTS

WO    2014040608 A1    3/2014

OTHER PUBLICATIONS

International Search Report and Written Opinion dated Jan. 23, 2015 in related International Application No. PCT/SE2014/050573.

*Primary Examiner* — David Bilodeau
(74) *Attorney, Agent, or Firm* — Sage Patent Group

(57) ABSTRACT

The disclosure relates to a method for controlling an uplink noise figure and gain in a distributed antenna system network comprising at least one intermediate radio unit and one or more remote radio heads connected via a respective link to the at least one intermediate radio unit. The method comprises: establishing a target noise figure, an adjusting, for each link between the one or more remote radio heads and the intermediate radio unit, attenuation such as to obtain the target noise figure for each remote radio head connected to the at least one intermediate radio unit. The disclosure also relates to corresponding distributed antenna system network, devices, computer programs, and computer program products.

17 Claims, 6 Drawing Sheets

(56) References Cited

U.S. PATENT DOCUMENTS

2011/0306380 A1 12/2011 Zavadsky et al.
2013/0095870 A1 4/2013 Phillips et al.
2015/0156577 A1* 6/2015 Kofler ...................... H04B 1/18
　　　　　　　　　　　　　　　　　　　　　　　　　　381/120

* cited by examiner

METHOD AND NODE FOR CONTROLLING AN UPLINK NOISE FIGURE AND GAIN

TECHNICAL FIELD

The technology disclosed herein relates generally to the field of distributed antenna system networks and in particular to method and nodes for controlling an uplink noise figure and gain in such networks.

BACKGROUND

In a distributed antenna system network a number of antennas are distributed geographically to cover a geographic area (a cell), each antenna covering a particular part thereof. The distributed antenna system is typically deployed in an indoor environment and uses a rather low transmission power. The antennas, also denoted remote radio heads in the following, are all connected by means of a respective cable to a radio unit, which thus receives signals from and transmits signals to the various remote radio heads. The single radio unit (or radio base station) may thus provide coverage e.g. in different parts of a building, each part having a properly placed remote radio head. A communication device can then move between the coverage of the different remote radio heads while staying within the same cell.

A communication device located at a downlink (DL, the direction from base stations to the communication device) cell border between the coverage of the distributed antenna system network and the coverage of a high transmission power network node (e.g. base station of a macro cell) will be at the point where it receives signaling from both cells with approximately the same strength. At this cell border, there may be a large difference between the DL transmission power sent from the remote radio head on the one hand and the DL transmission power sent from the base station of the macro cell on the other hand. The communication device, receiving signaling from both cells with approximately same strength, will then be much closer to the remote radio head than to the base station of the macro cell.

At this downlink cell border, the uplink (UL, the direction from the communication device to the base stations) path loss is much lower to the remote radio head than to the base station of the macro cell. This means that the radio unit cell will be dominating the power control of the communication device. This leads to the UL power being regulated down to a level that is suitable for the remote radio unit cell, but that is much too low for the macro cell.

This UL/DL imbalance leads to problems e.g. in view of soft handover, and also e.g. if the macro cell provides a high-speed downlink packet access (HSDPA) service to the communication device, since the macro cell will, in this scenario, have difficulties receiving a high-speed dedicated physical control channel (HS-DPCCH), which is only decoded in the serving cell (i.e. in the macro cell providing the DL HS service). The HSDPA throughput for the communication device will thus suffer. Still another problem is the ability of the communication devices to perform a successful random access.

SUMMARY

An object of the present disclosure is to solve or at least alleviate at least one of the above mentioned problems.

The object is according to a first aspect achieved by a method for controlling an uplink noise figure and gain in a distributed antenna system network comprising at least one intermediate radio unit and one or more remote radio heads connected via a respective link to the at least one intermediate radio unit. The method comprises establishing a target noise figure, and adjusting, for each link between the one or more remote radio heads and the intermediate radio unit, attenuation such as to obtain the target noise figure for each remote radio head connected to the at least one intermediate radio unit.

The method provides a way of making the length of the links (cables) between different remote radio heads and an intermediate radio unit to appear to be the same, by providing an active adjustment of the attenuation. Thereby the method overcomes problems related to unbalanced uplink/downlink. Further, the method solves a problem of a large spread in noise figure and gain of the various remote radio heads, which render the setting of a correct thermal noise floor and gain difficult. Still further, the method reduces the effects of attenuation in a cable increasing rapidly with respect to frequency owing to the adjustment of the attenuation so that all links obtain essentially the same target noise figure.

The object is according to a second aspect achieved by a distributed antenna system network comprising at least one intermediate radio unit and one or more remote radio heads connected via a respective link to the at least one intermediate radio unit. The distributed antenna system network is configured for controlling an uplink noise figure and comprises at least one processor; and at least one memory storing instructions that, when executed by the at least one processor, causes the distributed antenna system network: establish a target noise figure, and adjust, for each link between the one or more remote radio heads and the intermediate radio unit, attenuation such as to obtain the target noise figure for each remote radio head connected to the at least one intermediate radio unit.

The object is according to a third aspect achieved by a device of a distributed antenna system network. The device is configured for controlling an uplink noise figure and comprises at least one processor; and at least one memory storing instructions that, when executed by the at least one processor, causes the device to: establish a target noise figure, and adjust, for a link between a remote radio head and an intermediate radio unit, attenuation such as to obtain the target noise figure for the remote radio head connected to the intermediate radio unit.

The object is according to a fourth aspect achieved by a computer program for a device of a distributed antenna system network. The device is configured for adapting an uplink noise figure. The computer program comprises computer program code, which, when run on the device causes the device to: establish a target noise figure, and adjust, for a link between a remote radio head and an intermediate radio unit, attenuation such as to obtain the target noise figure for the remote radio head connected to the intermediate radio unit.

The object is according to a fifth aspect achieved by a computer program product comprising a computer program as above, and a computer readable means on which the computer program is stored.

The object is according to a sixth aspect achieved by a device of a distributed antenna system network comprising first means for establishing a target noise figure. The device comprises second means for adjusting, for a link between a remote radio head and an intermediate radio unit, attenuation such as to obtain the target noise figure for the remote radio head connected to the intermediate radio unit.

Further features and advantages of the present disclosure will become clear upon reading the following description and the accompanying drawings.

DETAILED DESCRIPTION

Figure 1:
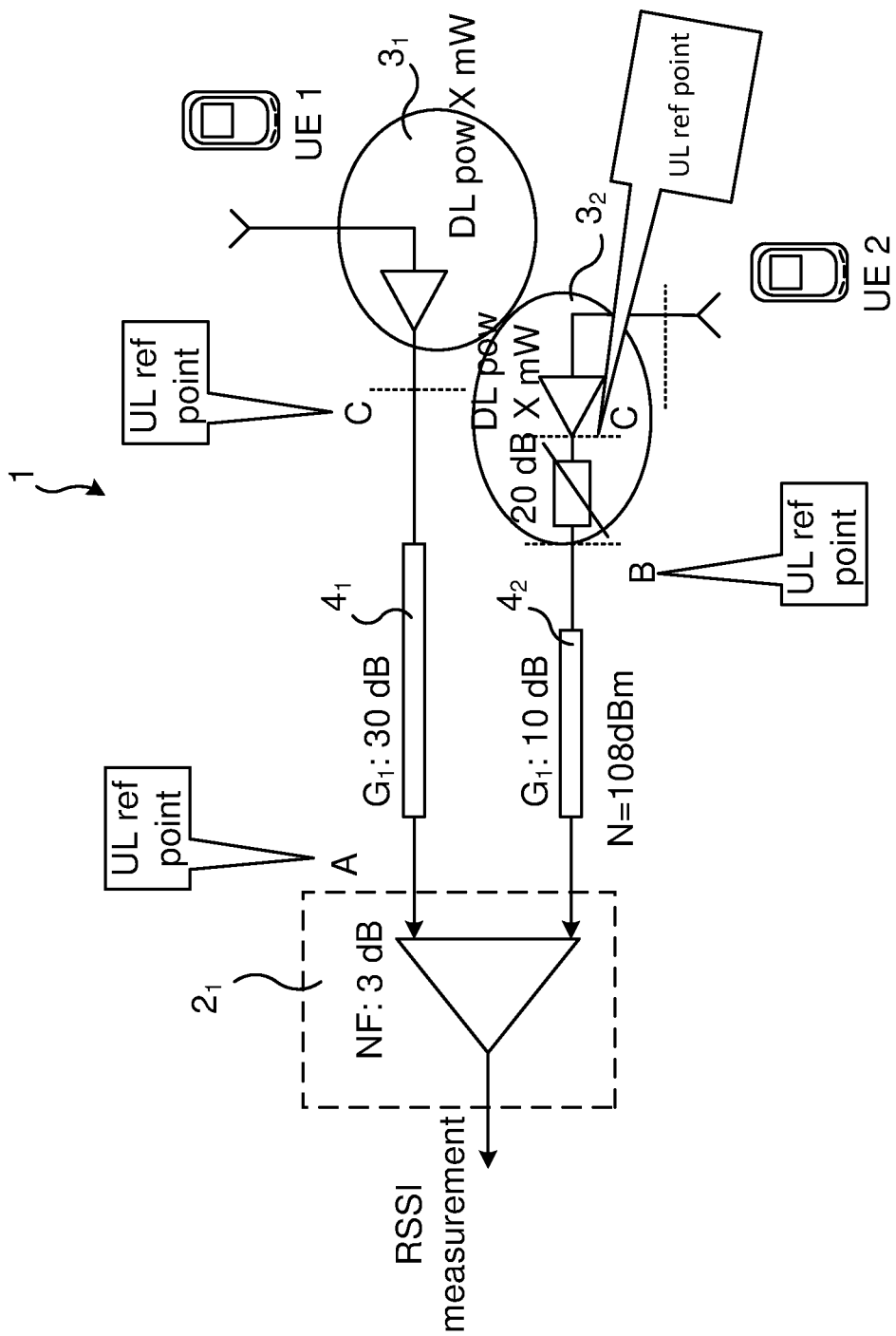
FIG. 1 illustrates, in an aspect of the present disclosure, an example of how to obtain same uplink attenuation on all cables.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In an aspect, the present disclosure provides a solution to the unbalanced UL/DL problem by applying desensitizing on the UL to make the remote radio heads less dominant in the UL (compared to the macro cell). The macro base station will thereby receive a better UL signal. The desensitizing function is, in an aspect, implemented in an intermediate radio unit (IRU) of a distributed antenna system network.

The remote radio heads are located at different distances from the intermediate radio unit and the cable lengths from the intermediate radio unit to the remote radio heads thus differ. This difference in cable length means that the attenuation in the cables will vary very much. The attenuation and noise figure (NF) being different for the different remote radio head branches means that it is difficult to set a suitable noise floor and gain. Therefore, in an aspect, this is overcome by setting the attenuation of links between the remote radio heads and the intermediate radio unit such as to be equal for all remote radio heads. However, this will affect the noise of the remote radio head branches, and the present disclosure provides, in an aspect, a solution also for this.

The noise factor (F) of a device of a radio frequency signal chain, or more generally of a system, is defined as the ratio of the input signal-to noise (SNR) and the output SNR:

$$F = \frac{SNR_{IN}}{SNR_{OUT}}$$

The noise figure (NF) if the noise factor expressed in decibels (dBs):

$$NF = 10 \log(F)$$
$$= 10 \log\left(\frac{SNR_{IN}}{SNR_{OUT}}\right)$$
$$= SNR_{IN,dB} - SNR_{OUT,dB}$$

The noise figure, NF, is thus expressed in dB, while the noise factor, F, is a linear correspondent (i.e. NF is F expressed in dBs). The total noise factor F of a radio frequency chain can be expressed by Friis' Formula:

$$F_{tot} = F1 + \frac{F2-1}{G1} + \frac{F3-1}{G1G2} + \ldots ,$$

where $F_n$ is the noise factor for the $n^{th}$ device and $G_n$ is the power gain of the $n^{th}$ device. The performance of e.g. a remote radio head can be expressed by the NF.

FIG. 1 illustrates a distributed antenna system network 1 of the present disclosure and an example of how to obtain same uplink attenuation on all links (irrespective of cable lengths) between the intermediate radio unit (IRU) and the various remote radio heads. Depending on how the system is modeled and how the antenna reference point is chosen, the $NF_{tot}$ can vary considerably. The reference point could for example be chosen to be just before the IRU $2_1$ of the distributed antenna system 1, illustrated at reference point denoted A. Alternatively, the reference point could be chosen to be at the remote radio head $3_2$ having the shortest cable as illustrated at reference point denoted B. These alternatives, as well as other alternatives, have their advantages as well as disadvantages. However, in the present disclosure, the UL attenuation is set to be equal for all remote radio heads $3_1$, $3_2$. The remote radio head $3_1$ having the longest cable and thus presumably the highest attenuation (since the same type of cables are typically used for all links) is the uppermost remote radio head in the figure. The reference point denoted C is then set as the uplink antenna reference point. In order for all links from the IRU to the remote radio heads to have same attenuation, the attenuation to the lowermost remote radio head $3_2$ may be adjusted by a variable attenuator, such as to be equal to the attenuation of the longest cable (i.e. the cable to the uppermost remote radio head $3_1$). In the particular example illustrated, the cable attenuation of the first cable $4_1$ to the first remote radio head $3_1$ is 30 dB, while the cable attenuation of the second cable $4_2$ to the second remote radio head $3_2$ is 10 dB. The variable attenuator of the second remote radio head $3_2$ is therefore set to 20 dB, giving the same attenuation between the IRU $2_1$ to the first and second remote radio heads $3_1$, $3_2$. It is noted that instead of a variable attenuator, a variable gain stage could instead be used, i.e. reducing gain instead of increasing attenuation, or vice versa depending on need of the links.

The fact that the attenuation from the IRU $2_1$ to the first and second remote radio heads $3_1$, $3_2$ is equal (and for all other remote radio heads, not illustrated) will provide a good antenna reference point. For example, the UL/DL imbalance to a neighboring macro cell depends on the largest cable length, and all communication devices will have a correct initial transmission power. A first communication device, denoted UE1, communicating via the first remote radio head $3_1$, and a second communication device, denoted UE2, communicating via the second remote radio head $3_2$, will have the same UL pathloss.

Figure 2:
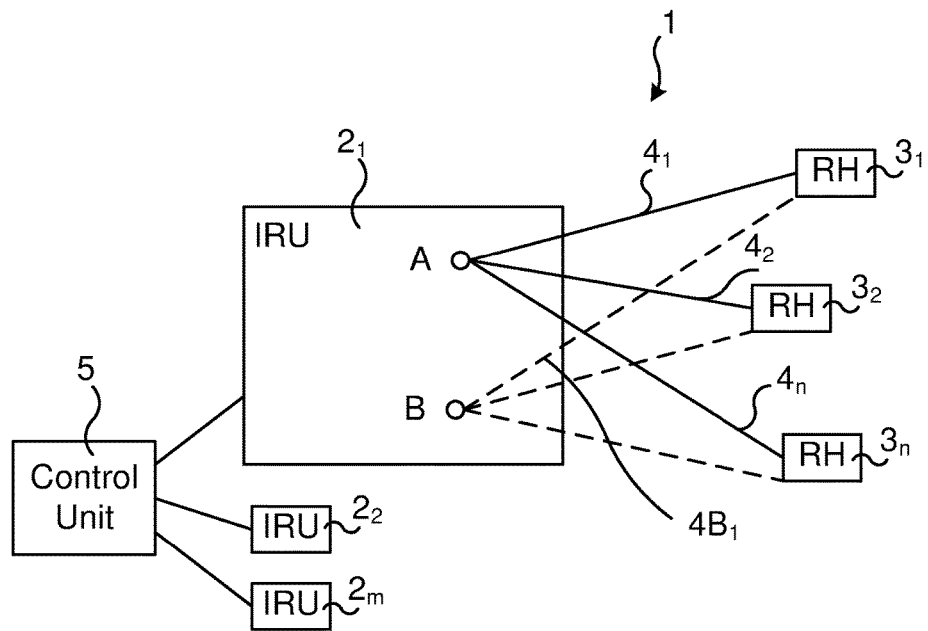
FIG. 2 illustrates schematically an embodiment of a distributed antenna system network of an aspect of the present disclosure.

FIG. 2 illustrates schematically an embodiment of a distributed antenna system network 1 of an aspect of the present disclosure. The distributed antenna system network 1 comprises a number of intermediate radio units (IRUs) $2_1$, $2_2$, ..., $2_m$ each connected to a control unit 5. The IRUs $2_1$, $2_2$, ..., $2_m$ (described more in detail with reference to FIG. 3) are also each connected to a number of remote radio heads. For example, a first port A of a first IRU $2_1$ is connected to the remote radio heads $3_1$, $3_2$, ..., $3_n$ via a respective link $4_1$, $4_2$, ..., $4_n$, the link comprising a cable able to distribute carriers to the remote radio heads on an intermediate frequency (IF). The first IRU $2_1$ may comprise further such ports, e.g. a second port B connected to the remote radio heads $3_1$, $3_2$, ..., $3_n$ via a respective link (cable), as illustrated by dashed lines, the first link indicated at reference numeral $4B_1$. As a particular example, each port A, B of each IRU $2_1$, $2_2$, ..., $2_m$ may be connected to eight remote radio heads $3_1$, $3_2$, ..., $3_8$.

The remote radio head $3_1$, $3_2$, ..., $3_n$ receives an UL radio frequency (RF) signal from a communication device (not illustrated) and downconverts the UL RF signal to an intermediate frequency (IF) signal and sends it over the link $4_1$, $4_2$, ..., $4_n$ to the IRU $2_1$. In the DL, the remote radio head $3_1$, $3_2$, ..., $3_n$ receives IF signals from the IRU $2_1$, and correspondingly upconverts the IF signals to RF signals for transmission over an air interface to the communication devices.

By using IF over the links $4_1$, $4_2$, ..., $4_n$ instead of RF, cheaper cables with high RF attenuation may be used, such as for instance standardized cables for Ethernet, e.g. enhanced category 5 cable (CAT5e), CAT6 or CAT7 cables.

Figure 3:
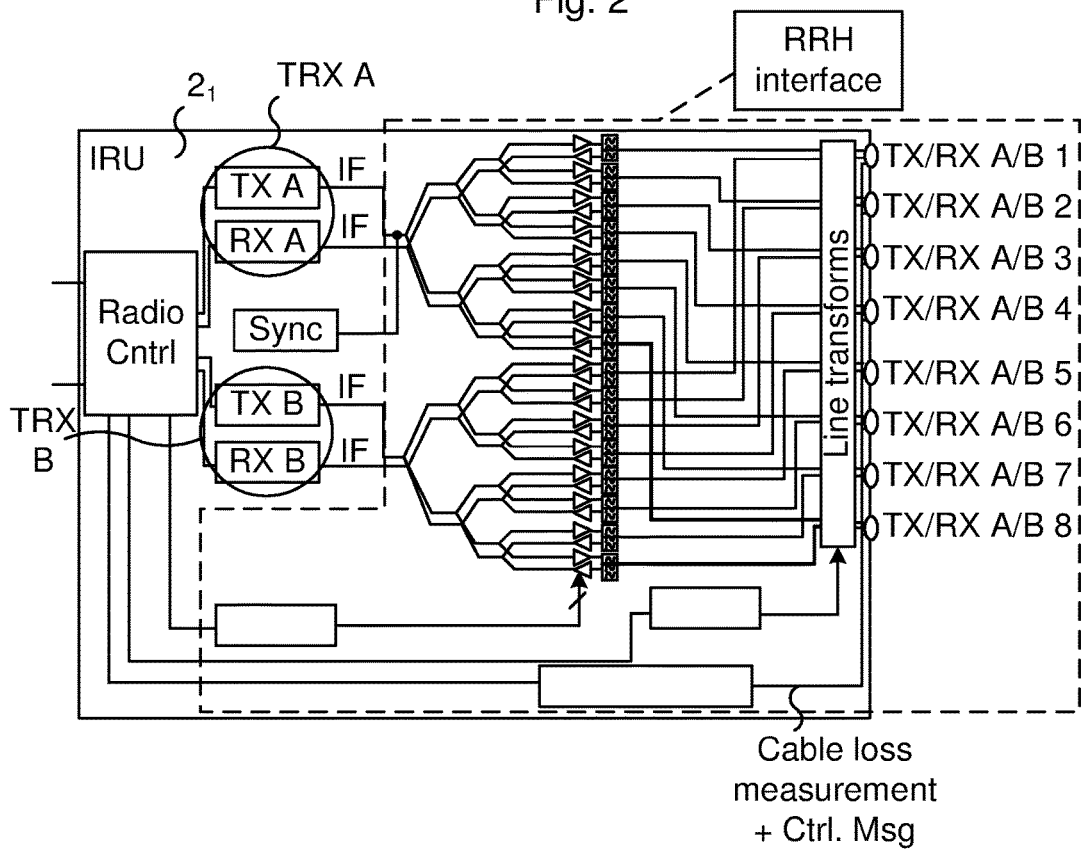
FIG. 3 illustrates an intermediate radio unit.

FIG. 3 illustrates the intermediate radio unit $2_1$ in some more detail. The IRU $2_1$ may thus comprise e.g. two ports, port A and port B (also denoted branches A and B), each comprising transmitter circuitry (TX A, TX B) and receiving circuitry (RX A, RX B). In the figure, the transmitter circuitry TX A and receiving circuitry RX A for port A are encircled and denoted TRX A, and correspondingly the transmitter circuitry TX B and receiving circuitry RX B for port B are encircled and denoted TRX B. Each port A, B is, as mentioned, connected to a number of remote radio heads. In the illustrated case, each of the two ports A, B are connected to eight remote radio heads $3_1$, $3_2$, ..., $3_8$ (the remote radio heads not illustrated in this figure), but it is noted that the number of ports and the number of remote radio heads may be higher or lower as well. The IRU $2_1$ thus comprises an interface towards the remote radio heads $3_1$, $3_2$, ..., $3_n$ (denoted RRH Interface in the figure). In the illustrated case there may be a link between a first remote radio head $3_1$ (of the eight remote radio heads) and the intermediate radio unit $2_1$, and in particular between an input (denoted TX/RX A/B 1 in the figure) of the intermediate radio unit $2_1$ which input corresponds to the first remote radio head $3_1$. This link, in particular this cable, may comprise a number of twisted pairs, each pair comprising two wires carrying signals. In the illustrated case, only two such pairs would be needed (one for port A and one for port B), and any additional pairs could be used e.g. for powering the remote radio heads. It is however noted that such power could be fed on the same pairs as the IF signals.

In this case, each remote radio head $3_1$, $3_2$, ..., $3_8$ may be configured to support two RF branches, i.e. branch to port A and branch to port B. Each remote radio head $3_1$, $3_2$, ..., $3_8$ may however support multiple antenna branches. The multiple antenna branches of a remote radio head can, in an aspect of the disclosure, be individually controlled. The signals conveyed to the IRU from two such antenna branches of the remote radio head may experience different attenuation e.g. since cable attenuation can be slightly different between pairs of wires in the same link (cable) (the signals being conveyed on different such wire pairs).

The IRU $2_1$ may comprise further components and circuitry, such as amplifiers, a radio controller, synchronization devices, switches, Frequency-shift keying (FSK) modems, line transforms and overvoltage protection devices etc. Such components and circuitry are schematically indicated by empty boxes.

In an aspect of the present disclosure, a target noise figure is set which should be obtained by all the remote radio heads $3_1$, $3_2$, ..., $3_n$. This can be accomplished by adjusting the UL attenuation of the links individually so that all the remote radio heads $3_1$, $3_2$, ..., $3_n$ indeed obtain the target noise figure. The attenuation may be adjusted in the remote radio heads, and/or in the IRU $2_1$. A remote radio head with a cable having a low attenuation (i.e. remote radio head being close to the IRU) may need to add much attenuation, e.g. by using a variable attenuator, to reach the target noise figure. Another remote radio head may need to add attenuation beyond the capability of the variable attenuator thereof, and additional noise could then be added at the corresponding port of the IRU. Various embodiments in this respect are described in the following with reference to FIGS. 4, 5 and 6.

Figure 4:
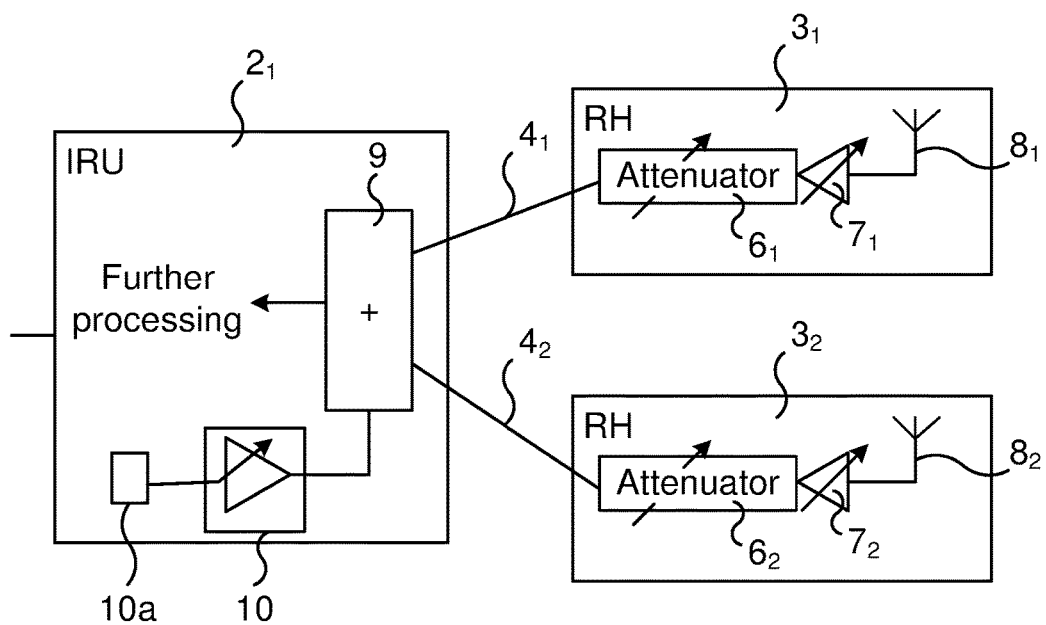
FIG. 4 illustrates schematically an embodiment of a distributed antenna system network of an aspect of the present disclosure.

FIG. 4 illustrates schematically an embodiment of a distributed antenna system network 1, and in particular the remote radio heads $3_1$, $3_2$, ..., $3_n$ and the IRU $2_1$. Each remote radio head $3_1$, $3_2$, ..., $3_n$ comprises a variable attenuator $6_1$, $6_2$, ..., $6_n$ and an amplifier $7_1$, $7_2$, ..., $7_n$, which may be a variable-gain amplifier as illustrated in the figure. The remote radio heads $3_1$, $3_2$, ..., $3_n$ may also or alternatively comprise a variable gain stage (not illustrated) for reducing or increasing gain on the links $4_1$, $4_2$, ..., $4_n$. Each remote radio head $3_1$, $3_2$, ..., $3_n$ also comprises an antenna device $8_1$, $8_2$, ..., $8_n$ for receiving signaling from and transmitting signaling to communication devices within their coverage. The IRU $2_1$, which is schematically illustrated in FIG. 4, comprises an interface 9 towards the remote radio heads $3_1$, $3_2$, ..., $3_n$ (reference is made to FIG. 3 for details thereof), for receiving the uplink signals from the remote radio heads $3_1$, $3_2$, ..., $3_n$ (and sending downlink signals to the remote radio heads $3_1$, $3_2$, ..., $3_n$). For the uplink communication, the remote radio heads may downconvert a received uplink (RF) signal to IF, as mentioned earlier, and send it over its link to the IRU $2_1$. The signals are combined (in a combiner) and processed further. Such further signal processing may comprise extracting received IF signals and forward them to a receiver back-end, which downconverts the signals from IF to an analogue baseband signal which is further filtered and digitized. Such receiver back-end may send combined received signals in digital form to the baseband module for further processing such as demodulation, decoding etc. as known in the art per se.

Alternatively, the received IF signals could be sampled directly (i.e. sampled on IF) and then be digitally down-coverted.

Figure 5:
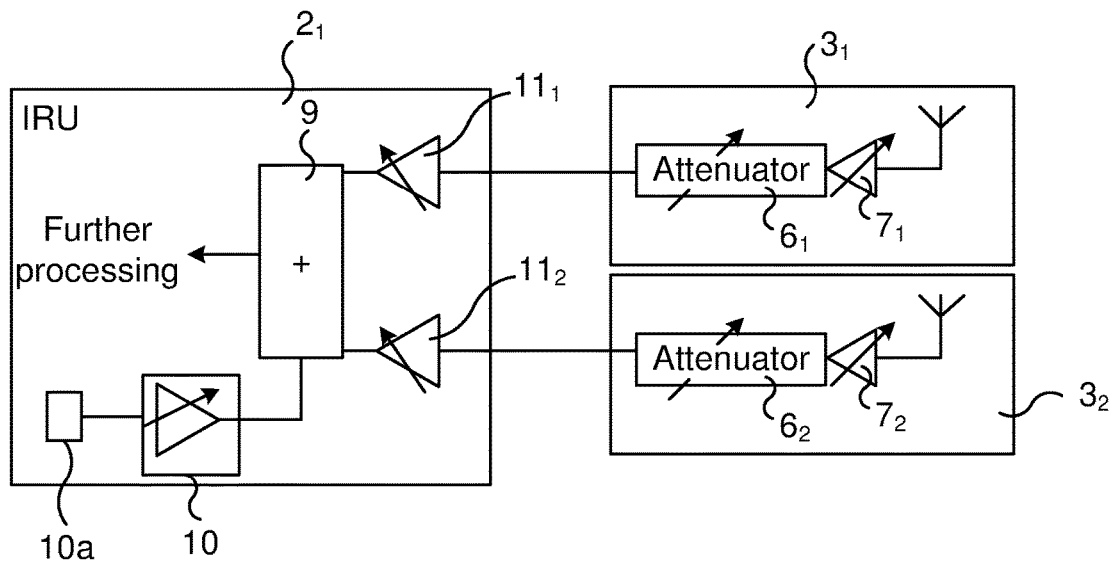
FIG. 5 illustrates schematically an embodiment of a distributed antenna system network of an aspect of the present disclosure.

The IRU $2_1$ may further comprise an amplifier 10, e.g. a variable-gain amplifier comprising a noise source 10a for noise injection. By adding noise to a signal combined in the IRU $2_1$ the noise figure for branches connected to the IRU $2_1$ be increased if needed. This can thus be accomplished by using the variable-gain amplifier 10, which may comprise an analog amplifier or a digital amplifier. FIG. 5 illustrates schematically an embodiment of a distributed antenna system network 1 of an aspect of the present disclosure. The difference in this embodiment compared to the embodiment of FIG. 4, is that the IRU $2_1$ comprises variable-gain amplifiers $11_1$ and $11_2$ for each input of the IRU $2_1$. That is, a variable-gain amplifier is provided for each remote radio head (before combination of signals), in contrast to the embodiment of FIG. 4, wherein the variable-gain amplifier is adding noise after combination of the signals received at the different remote radio heads.

Figure 6:
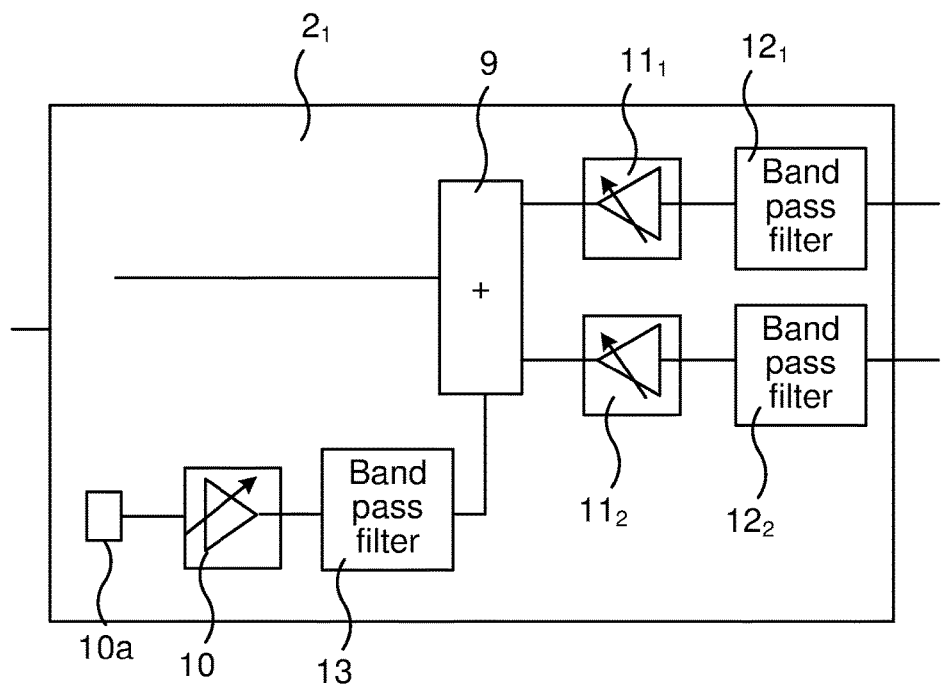
FIG. 6 illustrates schematically an embodiment of a distributed antenna system network of an aspect of the present disclosure.

FIG. 6 illustrates schematically an embodiment of a distributed antenna system network 1 of an aspect of the present disclosure. In various embodiments, the IRU $2_1$ may be adapted to handle frequency band specific noise or carrier specific noise. For example, the IRU $2_1$ may comprise filters $12_1$, $12_2$, e.g. bandpass filters, in the uplink direction from the remote radio heads located before the variable-gain amplifier $11_1$, $11_2$, such as to filter out a specific frequency band for which noise is added. However, in other embodiments, the filters $12_1$, $12_2$, are omitted, and a filter 13, preferably a configurable filter, is provided. The filter 13 may be provided in connection with the amplifier 10, in the figure the filter 13 is illustrated as connected between the amplifier 10 and the interface (combiner) 9, but such filter 13 could alternatively be placed before the amplifier 10 (i.e. feeding the amplifier with signals instead of vice versa). The purpose of the filter 13 is to ensure that added noise is limited to only a part of the IF band, e.g. where there is a WCDMA carrier, while blocking noise for other parts of the IF band where there may be signals not needing desensitization (e.g. LTE). As a particular example, if the distributed antenna system network 1 is used for both WCDMA and LTE communication, e.g. having WCDMA at 40-50 MHz and LTE at 60-70 MHz, then the filter 13 should be configured to have a passband of 40-50 MHz and stopband from 60 MHz.

Figure 7:
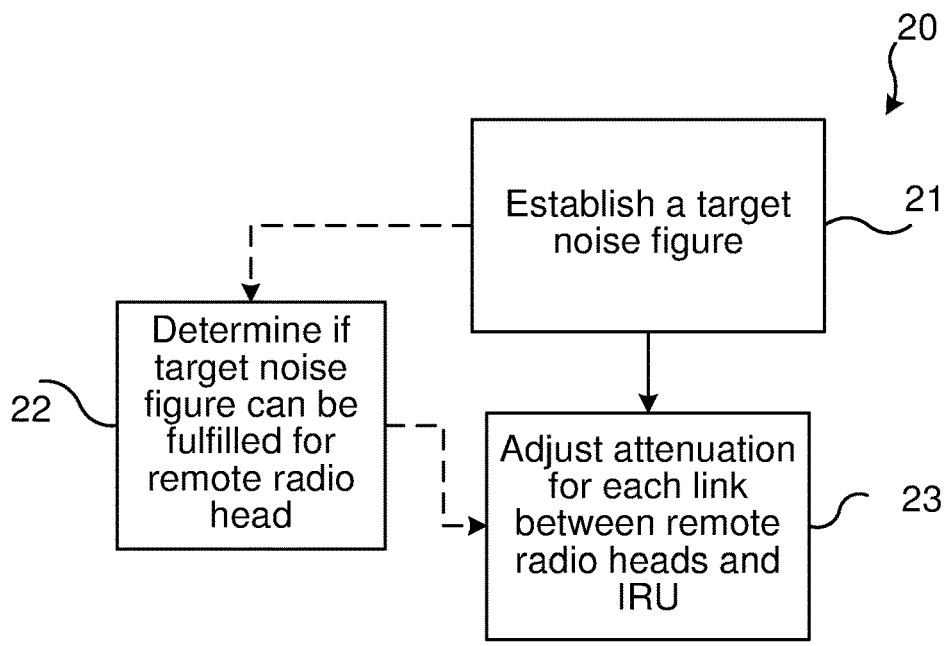
FIG. 7 illustrates a flow chart over steps of a method in a distributed antenna system network in accordance with the present disclosure.

FIG. 7 illustrates a flow chart over steps of a method in a distributed antenna system network 1 in accordance with the present disclosure. The method 20 for controlling an uplink noise figure and gain may be implemented in a distributed antenna system network 1 such as the networks 1 that have been described with reference to FIGS. 2-5. The distributed antenna system network 1 comprises at least one intermediate radio unit $2_1$ and one or more remote radio heads $3_1$, $3_2$ connected via a respective link $4_1$, $4_2$ to the at least one intermediate radio unit $2_1$. The method 20 may be implemented in the intermediate radio unit $2_1$, in the remote radio heads $3_1$, $3_2$, or in a control unit 5. The method 20 may alternatively be implemented in a distributed manner within the distributed antenna system network 1, wherein two or more devices perform one or more functions.

The method 20 comprises establishing 21 a target noise figure. It is noted that the noise figure and noise factor are the same "noise measure" expressed in decibel (dB) and expressed in linear scale, respectively, and that the establishing could equally well be established in the linear scale. The target noise figure may be a configurable parameter that may be set by the operator of the distributed antenna system network 1. The establishing 21 may for instance comprise retrieving the target noise figure from a database. As another example, if the method 20 is implemented in the intermediate radio unit $2_1$, the intermediate radio unit $2_1$ may be configured to receive the target noise figure from the control unit 5, the establishing 21 thus comprising receiving in the intermediate radio unit $2_1$ the target noise figure from the control unit 5.

The method 20 comprises adjusting 23, for each link $4_1$, $4_2$ between the one or more remote radio heads $3_1$, $3_2$ and the intermediate radio unit $2_1$, attenuation such as to obtain the target noise figure for each remote radio head $3_1$, $3_2$ connected to the at least one intermediate radio unit $2_1$. The attenuation may be adjusted, e.g. added to, in the intermediate radio unit $2_1$, for each port A, B, or the attenuation may be added in each remote radio head $3_1$, $3_2$, or the attenuation may be adjusted in both the remote radio head $3_1$ and the intermediate radio unit $2_1$. It is thus noted that the attenuation may be adjusted anywhere in the signal chain from the reception of the signal at an antenna of the remote radio head $3_1$ to the intermediate radio unit $3_1$. As a particular example, if the target noise figure is set to a high value, the attenuation could be adjusted where the signal has the lowest power, which typically is close to the antenna receiving the signal, and the attenuation could thus be adjusted in the remote radio head $3_1$.

In an embodiment, the establishing 21 the target noise figure comprises:
  measuring in each remote radio head $3_1$, $3_2$ a respective cable attenuation and reporting it to the intermediate radio unit $2_1$,
  establishing, in the intermediate radio unit $2_1$, the highest cable attenuation among the received reports about measured cable attenuations, and
  establishing 21 the target noise figure to be equal to a noise figure corresponding to the noise figure of the link $4_1$, $4_2$ having the highest cable attenuation.

In an embodiment, the establishing 21 the target noise figure comprises:
  measuring in the intermediate radio unit $2_1$ a respective cable attenuation,
  establishing, in the intermediate radio unit $2_1$, the highest cable attenuation among the measured cable attenuations, and
  establishing 21 the target noise figure to be equal to a noise figure corresponding to the noise figure of the link $4_1$, $4_2$ having the highest cable attenuation.

From the above two embodiments it is clear that cable attenuation measurements may be performed in either the intermediate radio unit or in the remote radio head. Yet another alternative to determine the cable attenuation is to perform echo measurement. That is, one side, e.g. the intermediate radio unit, transmits for instance a time pulse along the cable to the remote radio head, and determine the cable attenuation based on analysis of reflected signals together with knowledge about cable termination impedance in the remote radio head. In an embodiment, the method 20 comprises after the establishing 21 of the target noise figure and before the adjusting 23 (see FIG. 7):
  determining 22, for each remote radio head $3_1$, $3_2$, whether the established target noise figure can be fulfilled for the respective remote radio head $3_1$, $3_2$.

In a variation of the above embodiment, the adjusting 23 comprises for the case of each of the one or more remote radio heads $3_1$, $3_2$ being able to fulfil the target noise figure:

adjusting 23, in each remote radio head $3_1$, $3_2$, attenuation such as to obtain the target noise figure.

In another variation of the above embodiment, the method 20 comprises for the case of one or more remote radio heads $3_1$, $3_2$ being unable to fulfil the target noise figure:

setting, in each remote radio head $3_1$, $3_2$ unable to fulfil the target noise figure, the attenuation of a variable attenuator $6_1$, $6_2$ such as to obtain a maximum achievable attenuation, and adding, in the intermediate radio unit $2_1$, additional noise such as to obtain the target noise figure.

In a variation of the above embodiment, the adjusting comprises adding generated frequency band specific noise.

In an embodiment, the method 20 comprises for the case of one or more remote radio heads $3_1$, $3_2$ being unable to fulfil the target noise figure:

sending, from the remote radio head $3_1$, $3_2$ being unable to fulfil the target noise figure, a message to the intermediate radio unit 2 informing about this inability.

In an embodiment, the establishing 21 of the target noise figure is performed in a control unit 5, e.g. by an operator setting the target noise figure and the noise figure being signaled to the intermediate radio unit. In another embodiment the establishing 21 is performed in the intermediate radio unit $2_1$, e.g. by receiving from the control unit 5 the target noise figure.

In an embodiment, the method 20 is performed in the one or more remote radio heads $3_1$, $3_2$ and the establishing 21 the target noise figure comprises receiving, from a control unit 5 or from the an intermediate radio unit $2_1$, the target noise figure.

In another embodiment, the method is performed in the distributed antenna system network 1. That is, the steps of the various embodiments of the method 20 may be performed in different parts (i.e. different devices) of the distributed antenna system network 1.

In an embodiment, the uplink noise figure and gain is controlled by adapting the uplink noise figure and gain in view of the number of active remote radio heads $3_1$, $3_2$.

In an embodiment, the adjusting 23 is performed such as to obtain the target noise figure and linearity for each remote radio head $3_1$, $3_2$ connected to the at least one intermediate radio unit $2_1$. The gain/attenuation of each link may be adjusted in order to obtain a number of target parameters, however comprising at least the noise figure (i.e. noise figure being one such target parameter). The sensitivity of a radio receiver performance is limited by noise figure and large signals by linearity.

The method 20 thus provides an advantage in that it enables to obtain a target noise figure and gain for each link between the intermediate radio unit and the remote radio heads, even when the conditions change. For example, if only a subset of all the remote radio heads is used at particular time, then the method automatically adjusts the attenuation such as to obtain same attenuation for all links. This is true also for e.g. changes in cabling (e.g. some cabling being exchanged or some cables being prolonged or shortened e.g. since a remote radio head is moved). The method 20 may thus continuously and automatically and without intervention of the operator adapt the target noise figure and gain in view of such changes, e.g. change in number of active remote radio heads.

A distributed antenna system network 1 is provided comprising at least one intermediate radio unit $2_1$ and one or more remote radio heads $3_1$, $3_2$ connected via a respective link $4_1$, $4_2$ to the at least one intermediate radio unit $2_1$. The distributed antenna system network 1 is configured for controlling an uplink noise figure and comprises:

at least one processor 30, 40; and at least one memory 31, 41 storing instructions that, when executed by the at least one processor 30, 40, causes the distributed antenna system network 1:

establish a target noise figure, and adjust, for each link $4_1$, $4_2$ between the one or more remote radio heads $3_1$, $3_2$ and the intermediate radio unit $2_1$, attenuation such as to obtain the target noise figure for each remote radio head $3_1$, $3_2$ connected to the at least one intermediate radio unit $2_1$.

In an embodiment, the distributed antenna system network 1 is operative to establish the target noise figure by:

measuring in each remote radio head $3_1$, $3_2$ a respective cable attenuation and reporting it to the intermediate radio unit $2_1$, establishing, in the intermediate radio unit $2_1$, the highest cable attenuation among the received reports about measured cable attenuations, and establishing 21 the target noise figure to be equal to a noise figure corresponding to the noise figure of the link $4_1$, $4_2$ having the highest cable attenuation.

In an embodiment, the distributed antenna system network 1 is operative to establish the target noise figure by:

measuring in the intermediate radio unit $2_1$ a respective cable attenuation, establishing, in the intermediate radio unit $2_1$, the highest cable attenuation among the measured cable attenuations, and establishing 21 the target noise figure to be equal to a noise figure corresponding to the noise figure of the link $4_1$, $4_2$ having the highest cable attenuation.

In an embodiment, the distributed antenna system network 1 is operative to, after the establishing 21 of the target noise figure and before the adjusting 23:

determine, for each remote radio head $3_1$, $3_2$, whether the established target noise figure can be fulfilled for the respective remote radio head $3_1$, $3_2$.

In a variation of the above embodiment, the distributed antenna system network 1 is operative to adjust, for the case of each of the one or more remote radio heads $3_1$, $3_2$ being able to fulfil the target noise figure, by:

adjusting, in each remote radio head $3_1$, $3_2$, attenuation such as to obtain the target noise figure.

In another variation of the above embodiment, the distributed antenna system network 1 is operative to adjust, for the case of one or more remote radio heads $3_1$, $3_2$ being unable to fulfil the target noise figure, by:

setting, in each remote radio head $3_1$, $3_2$ unable to fulfil the target noise figure, the attenuation of a variable attenuator $6_1$, $6_2$ such as to obtain a maximum achievable attenuation, and adding, in the intermediate radio unit $2_1$, additional noise such as to obtain the target noise figure.

In a variation of the above embodiment, the distributed antenna system network 1 is operative to add generated frequency band specific noise.

In variations of the above two embodiments, the distributed antenna system network 1 is operative to, for the case of one or more remote radio heads $3_1$, $3_2$ being unable to fulfil the target noise figure:

send, from the remote radio head $3_1$, $3_2$ being unable to fulfil the target noise figure, a message to the intermediate radio unit $2_1$ informing about this inability.

In an embodiment, the establishing of the target noise figure is performed in a control unit 5 or in the intermediate radio unit $2_1$.

In an embodiment, the uplink noise figure and gain is controlled by adapting the uplink noise figure and gain in view of the number of active remote radio heads $3_1$, $3_2$.

Figure 8:
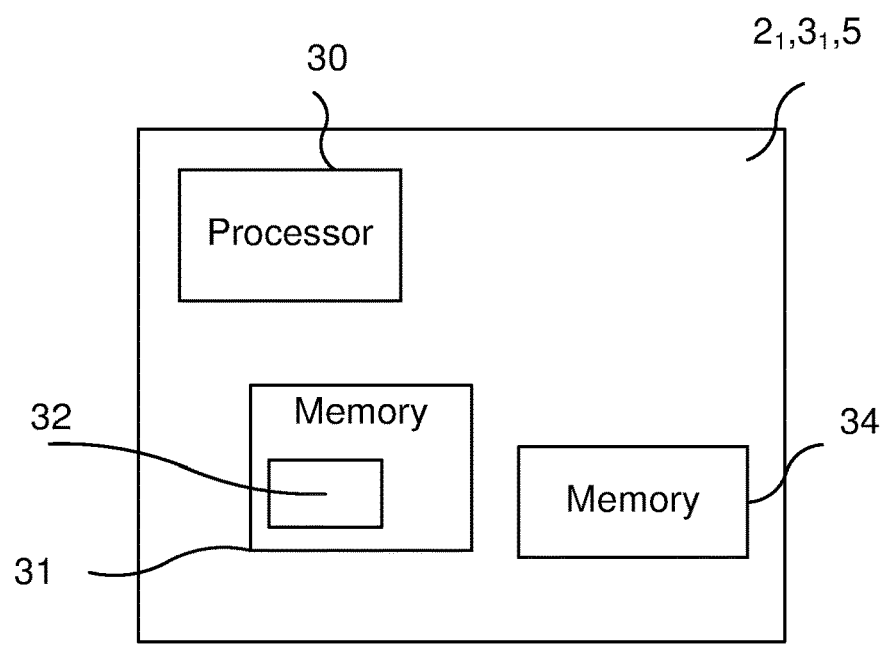
FIG. 8 illustrates schematically a device of a distributed antenna system network and means for implementing methods of the present disclosure.

FIG. 8 illustrates schematically a device $2_1$, $3_1$, 5 of a distributed antenna system network land means for implementing embodiments of the methods of the present disclosure. The method 20 as described with reference to FIG. 7 may be performed in the device, which device may be the control unit 5, the intermediate radio unit $2_1$ or the remote radio head. The device $2_1$, $3_1$, 5 comprises a processor 30 comprising any combination of one or more of a central processing unit (CPU), multiprocessor, microcontroller, digital signal processor (DSP), application specific integrated circuit etc. capable of executing software instructions stored in a memory 31, which can thus be a computer program product 31. The processor 30 can be configured to execute any of the various embodiments of the method as described in relation to FIG. 7.

When the device, in which the method 20 is performed, is the control unit 5, the control unit 5 may establish the target noise figure e.g. by being configured with it by the operator. The control unit 5 may retrieve the target noise figure from a memory. The control unit 5 may then adjust (e.g. add) attenuation, for each link $4_1$, $4_2$ between the one or more remote radio heads $3_1$, $3_2$ and the intermediate radio unit $2_1$, such as to obtain the target noise figure for each remote radio head $3_1$, $3_2$ connected to the at least one intermediate radio unit $2_1$. This can be accomplished by the control unit 5 instructing the intermediate radio unit 2 and/or each remote radio head $3_1$, $3_2$ to adjust the attenuation accordingly.

When the device, in which the method 20 is performed, is the intermediate radio unit $2_1$ the intermediate radio unit $2_1$ may establish the target noise figure e.g. by being configured with it by the operator or by receiving the target noise figure from the control unit 5. The intermediate radio unit $2_1$ may then adjust (e.g. add) attenuation, for each link $4_1$, $4_2$ between the one or more remote radio heads $3_1$, $3_2$ and the intermediate radio unit $2_1$, such as to obtain the target noise figure for each remote radio head $3_1$, $3_2$ connected to the at least one intermediate radio unit $2_1$. This can be accomplished by the intermediate radio unit $2_1$ itself adjusting (e.g. adding) attenuation and/or by instructing the each remote radio head $3_1$, $3_2$ to adjust the attenuation accordingly.

When the device, in which the method 20 is performed, is the remote radio head $3_1$, $3_2$, the remote radio head $3_1$, $3_2$ may establish the target noise figure e.g. by receiving the target noise figure from the control unit 5 or from the intermediate radio unit $2_1$. The remote radio head $3_1$, $3_2$ may then adjust (e.g. add) attenuation, for each link $4_1$, $4_2$ between the one or more remote radio heads $3_1$, $3_2$ and the intermediate radio unit $2_1$, such as to obtain the target noise figure for each remote radio head $3_1$, $3_2$ connected to the at least one intermediate radio unit $2_1$. This can be accomplished by remote radio head $3_1$, $3_2$ itself adjusting (e.g. adding) attenuation and/or by communicating with the intermediate radio unit so that it adjusts any additional attenuation needed.

A device 5, $3_1$ $2_1$ of a distributed antenna system network 1 is thus provided. The device 5, $3_1$ $2_1$, is configured for controlling an uplink noise figure and comprising:

at least one processor 30; and at least one memory 31 storing instructions that, when executed by the at least one processor 30, causes the device 5, $3_1$ $2_1$, to:

establish a target noise figure, and adjust, for a link $4_1$, $4_2$ between a remote radio head $3_1$, $3_2$ and an intermediate radio unit $2_1$, attenuation such as to obtain the target noise figure for the remote radio head $3_1$, $3_2$ connected to the intermediate radio unit $2_1$.

Still with reference to FIG. 8, the memory 31 can be any combination of read and write memory (RAM) and read only memory (ROM). The memory 31 also comprises persistent storage, which, for example, can be any single one or combination of magnetic memory, optical memory, solid state memory or even remotely mounted memory.

A data memory 34 may also be provided for reading and/or storing data during execution of software instructions in the processor 30. The data memory 34 can be any combination of read and write memory (RAM) and read only memory (ROM).

The present disclosure also encompasses a computer program product 31 comprising a computer program 32 for implementing the methods as described above, and a computer readable means on which the computer program 32 is stored. The computer program product 31 may be any combination of read and write memory (RAM) or read only memory (ROM). The computer program product 33 may also comprise persistent storage, which for example can be any single one or combination of magnetic memory, optical memory or solid state memory.

The present disclosure thus comprises a computer program 32 for a device 5, $2_1$, $3_1$ of a distributed antenna system network 1. The device 5, $2_1$, $3_1$ is configured for adapting an uplink noise figure. The computer program 32 comprises computer program code, which, when run on the device 5, $2_1$, $3_1$ causes the device 5, $2_1$, $3_1$ to:

establish a target noise figure, and adjust, for a link $4_1$, $4_2$ between a remote radio head $3_1$, $3_2$ and an intermediate radio unit $2_1$, attenuation such as to obtain the target noise figure for the remote radio head $3_1$, $3_2$ connected to the intermediate radio unit $2_1$.

The computer program product, or the memory, thus comprises instructions executable by the processor. Such instructions may be comprised in a computer program, or in one or more software modules or function modules.

Figure 9:
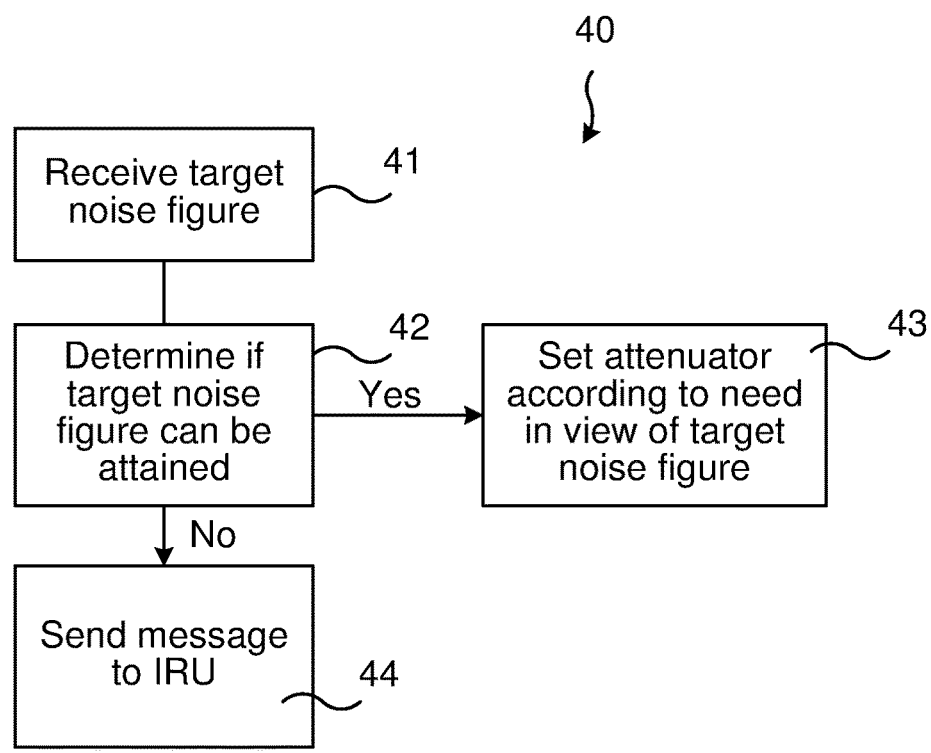
FIG. 9 illustrates a flow chart over steps of a method in a distributed antenna system network in accordance with the present disclosure.

FIG. 9 illustrates a flow chart over steps of a method in a distributed antenna system network 1 in accordance with the present disclosure. As described earlier, the method may be performed in a single device of the distributed antenna system network 1. In an embodiment, a method 40 for controlling an uplink noise figure in a distributed antenna system network 1 is provided. The distributed antenna system network 1 comprises at least a first intermediate radio unit $2_1$ and one or more remote radio heads $3_1$, $3_2$ connected via a respective cable $4_1$, $4_2$ to the at least first intermediate radio unit $2_1$. If the distributed antenna system network 1 comprises several intermediate radio units, for example also a second intermediate radio unit $2_2$, then the one or more remote radio heads $3_1$, $3_2$ may be connected via a respective link (cable) also to this second intermediate radio unit $2_2$. The method 40 comprises:

establishing $4_1$ a target noise figure, determining $4_2$, for each remote radio head $3_1$, $3_2$, whether the established target noise figure can be fulfilled; and for the case of each of the one or more remote radio heads $3_1$, $3_2$ being able to fulfil the target noise figure adjusting (e.g. adding) 43 in each remote radio head $3_1$, $3_2$ attenuation such as to obtain the target noise figure, and for the case of one or more remote radio heads $3_1$, $3_2$ being unable to fulfil the target noise figure sending 44, from the remote radio head $3_1$, $3_2$ being unable to fulfil the target noise figure, a message to the intermediate radio unit $2_1$ informing about this inability. The attenuation may then be provided by the intermediate radio unit $2_1$ or by providing as much attenuation as possible by the remote radio heads $3_1$, $3_2$ and adding the remaining part in the intermediate radio unit $2_1$ or by adjusting the target noise figure and then provide as much attenuation as possible by the remote radio heads $3_1$, $3_2$ and add the remaining part in the intermediate radio unit $2_1$.

Figure 10:
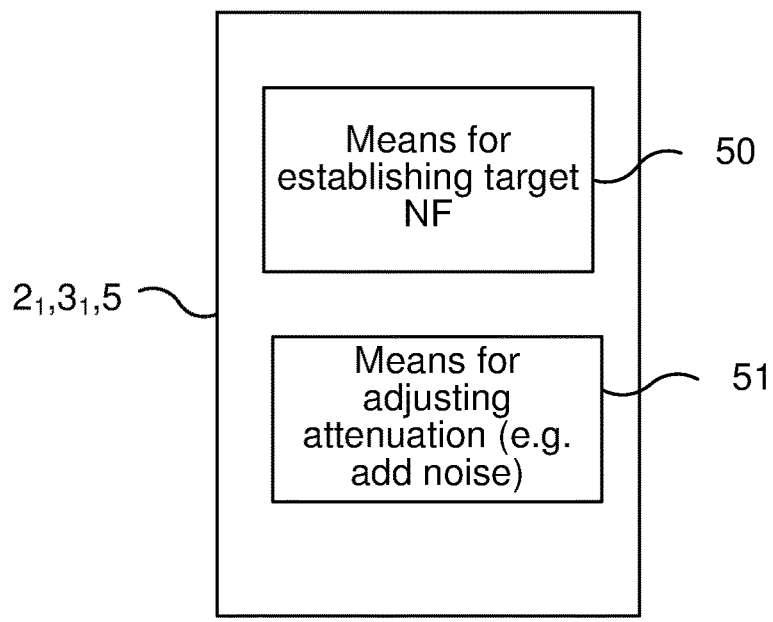
FIG. 10 illustrates a device of a distributed antenna system network comprising function modules/software modules for implementing methods of the present disclosure.

FIG. 10 illustrates a device of a distributed antenna system network 1 comprising function modules/software modules for implementing methods of the present disclosure. An example of an implementation using function modules/software modules is illustrated in FIG. 10, in particular illustrating a device 5, $2_1$, $3_1$ of a distributed antenna system network 1 comprising function modules for implementing embodiments of the methods of the present disclosure. The device 5, $2_1$, $3_1$ comprises first means 50, for instance a first function module, for establishing a target noise figure. The device 5, $2_1$, $3_1$ comprises second means 51, for instance a second function module, for adjusting, for a link $4_1$, $4_2$ between a remote radio head $3_1$, $3_2$ and an intermediate radio unit $2_1$, attenuation such as to obtain the target noise figure for the remote radio head $3_1$, $3_2$ connected to the intermediate radio unit $2_1$.

The device may comprise yet additional such means (not illustrated) for implementing the various steps and features of the present disclosure.

The function modules 50, 51 can be implemented using software instructions such as computer program executing in a processor and/or using hardware, such as application specific integrated circuits, field programmable gate arrays, discrete logical components etc.

The invention has mainly been described herein with reference to a number of embodiments. However, as is appreciated by a person skilled in the art, other embodiments than the particular ones disclosed herein are equally possible within the scope of the invention, as defined by the appended patent claims.

The invention claimed is:

1. A method for controlling an uplink noise figure and gain in a distributed antenna system network comprising at least one intermediate radio unit and one or more remote radio heads connected via a respective link to the at least one intermediate radio unit, the method comprising:
   establishing a target noise figure, wherein the establishing the target noise figure comprises:
      measuring a respective cable attenuation in the at least one intermediate radio unit or each remote radio head,
      establishing, in the at least one intermediate radio unit, the highest cable attenuation from the measured cable attenuations, and
      establishing the target noise figure to be equal to a noise figure corresponding to the noise figure of the link having the highest cable attenuation; and
   adjusting, for each link between the one or more remote radio heads and the intermediate radio unit, attenuation to obtain the target noise figure for each remote radio head connected to the at least one intermediate radio unit.

2. The method as claimed in claim 1, comprising, after the establishing of the target noise figure and before the adjusting:
   determining, for each remote radio head, whether the established target noise figure can be fulfilled for the respective remote radio head.

3. The method as claimed in claim 2, wherein the adjusting comprises for the case of each of the one or more remote radio heads being able to fulfil the target noise figure:
   adding, in each remote radio head, attenuation to obtain the target noise figure.

4. The method as claimed in claim 2, comprising for the case of one or more remote radio heads being unable to fulfil the target noise figure:
   setting, in each remote radio head unable to fulfil the target noise figure, the attenuation of a variable attenuator to obtain a maximum achievable attenuation, and
   adding, in the intermediate radio unit, additional noise to obtain the target noise figure.

5. The method as claimed in claim 4, wherein the adjusting comprises adding generated frequency band specific noise.

6. The method as claimed in claim 2, comprising for the case of one or more remote radio heads being unable to fulfil the target noise figure:
   sending, from the remote radio head being unable to fulfil the target noise figure, a message to the intermediate radio unit informing about this inability.

7. The method as claimed in claim 1, wherein the establishing of the target noise figure is performed in a control unit or in the intermediate radio unit.

8. The method as claimed in claim 1, wherein the method is performed in the one or more remote radio heads and wherein the establishing the target noise figure comprises receiving, from a control unit or from the an intermediate radio unit, the target noise figure.

9. The method as claimed in claim 1, wherein the uplink noise figure and gain is controlled by adapting the uplink noise figure and gain in view of the number of active remote radio heads.

10. The method as claimed in claim 1, wherein the adjusting is performed to obtain the target noise figure and to provide the obtained target noise figure for each remote radio head connected to the at least one intermediate radio unit.

11. A distributed antenna system network comprising at least one intermediate radio unit and one or more remote radio heads connected via a respective link to the at least one intermediate radio unit, the distributed antenna system network being configured for controlling an uplink noise figure and comprising:
   at least one processor; and
   at least one memory storing instructions that, when executed by the at least one processor, causes the distributed antenna system network to:
   establish a target noise figure, and
   adjust, for each link between the one or more remote radio heads and the intermediate radio unit, attenuation to obtain the target noise figure for each remote radio head connected to the at least one intermediate radio unit,
      wherein after the establishing of the target noise figure and before the adjusting the distributed antenna system network is operative to:
      determine, for each remote radio head, whether the established target noise figure can be fulfilled for the respective remote radio head, wherein for the case of one or more remote radio heads being unable to fulfil the target noise figure, the distributed antenna system network is operative to:

set, in each remote radio head unable to fulfil the target noise figure, the attenuation of a variable attenuator to obtain a maximum achievable attenuation, and add, in the intermediate radio unit, additional noise to obtain the target noise figure.

12. The distributed antenna system network as claimed in claim 11, operative to adjust, for the case of each of the one or more remote radio heads being able to fulfil the target noise figure, by: adding, in each remote radio head, attenuation to obtain the target noise figure.

13. The distributed antenna system network as claimed in claim 11, operative to add generated frequency band specific noise.

14. The distributed antenna system network as claimed in claim 11, operative to for the case of one or more remote radio heads being unable to fulfil the target noise figure: send, from the remote radio head being unable to fulfil the target noise figure, a message to the intermediate radio unit informing about this inability.

15. The distributed antenna system network as claimed in claim 11, wherein the establishing of the target noise figure is performed in a control unit or in the intermediate radio unit.

16. The distributed antenna system network as claimed in claim 11, wherein the uplink noise figure and gain is controlled by adapting the uplink noise figure and gain in view of the number of active remote radio heads.

17. A device of a distributed antenna system network, the device being configured for controlling an uplink noise figure and comprising:
  at least one processor; and
  at least one memory storing instructions that, when executed by the at least one processor, causes the device to:
  establish a target noise figure, wherein the device is configured to establish the target noise figure by:
    measuring a respective cable attenuation in at least one of the intermediate radio unit or each remote radio head,
    establishing, in the intermediate radio unit, the highest cable attenuation from the measured cable attenuations, and
    establishing the target noise figure to be equal to a noise figure corresponding to the noise figure of the link having the highest cable attenuation, and
  adjust, for a link between a remote radio head and an intermediate radio unit, attenuation to obtain the target noise figure for the remote radio head connected to the intermediate radio unit.

* * * * *